US006379411B1

(12) United States Patent
Turner et al.

(10) Patent No.: US 6,379,411 B1
(45) Date of Patent: Apr. 30, 2002

(54) TWO STROKE ENGINE EXHAUST EMISSIONS SEPARATOR

(75) Inventors: Terry D. Turner, Ammon; Bruce M. Wilding, Idaho Falls; Michael G. McKellar, Idaho Falls; Kevin T. Raterman, Idaho Falls, all of ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/656,312

(22) Filed: Sep. 6, 2000

Related U.S. Application Data
(60) Provisional application No. 60/199,928, filed on Apr. 26, 2000.

(51) Int. Cl.[7] .......................... B01D 45/16; F01N 3/05; F25B 9/02
(52) U.S. Cl. ...................... 55/394; 55/459.1; 55/459.5; 55/DIG. 30; 60/303; 62/5
(58) Field of Search ........................... 55/318, 392, 394, 55/459.1, 459.5, 447, DIG. 30; 60/303; 62/5

(56) References Cited

U.S. PATENT DOCUMENTS 3,577,728 A * 5/1971 Brimer et al. ................ 60/303
5,193,341 A * 3/1993 Sibbertsen et al. ........... 60/303
5,536,289 A * 7/1996 Spies et al. ................ 55/459.5

FOREIGN PATENT DOCUMENTS

DE          3128470 A1 *  1/1983

* cited by examiner

Primary Examiner—Roberts A. Hopkins
(74) Attorney, Agent, or Firm—Workman Nydegger & Seeley

(57) ABSTRACT

A separator for substantially resolving at least one component of a process stream, such as from the exhaust of an internal combustion engine. The separator includes a body defining a chamber therein. A nozzle housing is located proximate the chamber. An exhaust inlet is in communication with the nozzle housing and the chamber. A nozzle assembly is positioned in the nozzle housing and includes a nozzle moveable within and relative to the nozzle housing. The nozzle includes at least one passage formed therethrough such that a process stream entering the exhaust inlet connection passes through the passage formed in the nozzle, which imparts a substantially rotational flow to the process stream as it enters the chamber. A positioning member is configured to position the nozzle relative to the nozzle housing in response to changes in process stream pressure to adjust flowrate of said process stream entering into the chamber.

36 Claims, 6 Drawing Sheets

TWO STROKE ENGINE EXHAUST EMISSIONS SEPARATOR

RELATED APPLICATION

This application claims priority from United States provisional application Ser. No. 60/199,928 filed Apr. 26, 2000, and is incorporated by reference.

CONTRACTUAL ORIGIN OF THE INVENTION

This invention was made with United States Government support under Contract No. DE-AC07-99ID13727 awarded by the United States Department of Energy. The United States Government has certain rights in the invention.

BACKGROUND OF THE INVENTION

1. Field of the Invention

The present invention relates generally to methods and devices for managing the liquid and gaseous components of a variable pressure stream. More particularly, embodiments of the present invention relate to an exhaust emissions separator for management of internal combustion engine exhaust components.

2. Prior State of the Art

The popularity and widespread use of two-stroke engines is undisputed. Such engines are in extensive use throughout the United States, as well as in both industrialized and developing nations around the world. In particular, two-stroke engines are the power source of choice in such varied applications as snowmobiles, outboard motors, all-terrain vehicles, off-road vehicles, scooters, mopeds, lawn mowers, and chain saws, to name but a few. The typical two-stroke engine possesses a variety of features which make it ideally suited for such applications.

One such feature is the relative simplicity of the two-stroke engine. In general, the two-stroke engine possesses relatively few moving parts and components as compared to, for example, the more complex four stroke engine, so that operation and maintenance of the two-stroke engine is relatively simple. Further, because of this simplicity, a two-stroke engine is less likely to experience the breakdowns and failures that characterize more complex engines, and is thus somewhat more reliable. Another consequence of the relative simplicity of the two-stroke engine is that because the two-stroke engine utilizes relatively few parts, it can be readily produced at relatively low cost.

The simplicity of the two-stroke engine has other important consequences as well. For example, because of the relatively few parts employed in typical two-stroke engine designs, the two-stroke engine can be made very compact and light in weight. As a direct result of its light weight, the typical two-stroke engine has a relatively high power to weight ratio (PWR). The relatively high PWR of the typical two-stroke engine makes it ideally suited for applications, such as those noted above, where a relatively large amount of power is required, but where excessive engine weight would likely compromise the overall performance of the device.

While two-stroke engines possess numerous advantages, such engines are not without their shortcomings. A major shortcoming of typical two-stroke engines is their propensity to discharge exhaust containing a relatively large amount of unburned fuel and/or oil. This characteristic is primarily a consequence of the construction of the engine. In general, two-stroke engines operate in such a way that the vacuum created in the combustion chamber by the exit of pressurized exhaust serves to pull a fresh volume of unburned fuel and oil into the combustion chamber, preparatory to the compression stroke. As a result of the substantially simultaneous exit of exhaust and entry of unburned fuel, some of the unburned fuel and/or oil are pulled from the combustion chamber along with the exhaust, and discharged, unburned, to the atmosphere.

The omission of unburned oil and gas from the two-stroke engine exhaust is problematic for a number of reasons. First, any unburned gas omitted is necessarily gas that is not available for operation of the engine. Thus, the operational efficiency of the engine with regard to a given amount of fuel is significantly compromised. In fact, it is estimated that as much a twenty five percent to thirty five percent of the fuel that enters a typical two-stroke engine exits unburned with the exhaust. Thus, while they possess other significant advantages, two-stroke engines are not particularly fuel-efficient.

While the emission of unburned fuel, oil, and other heavy hydrocarbons, is of some interest insofar as the fuel efficiency of two-stroke engines is concerned, another significant effect of such emissions is the severe impact that they have on the environment. For example, the discharge of raw engine oil and fuel from outboard engines is a major cause of pollution in both fresh-water and salt-water waterways. It is estimated that nearly 166,000,000 gallons of petroleum products are discharged into the waterways of the United States alone each year. This high volume of pollutants is a direct consequence of the ubiquity of two-stroke engines and their operational characteristics.

Pollution generated by outboard engines, jet skis, and other water-based platforms is not limited solely to waterways however. At least some of the unburned fuel, oil, and heavy hydrocarbons are emitted as vapor from the engine. Thus, the two-stroke engines typically employed in water-based platforms pollute the air as well as the water. Pollution of the air is further exacerbated by land-based two-stroke engine platforms such as snowmobiles, chain saws, weed trimmers, motorcycles, and the like. Air pollution resulting from two-stroke engines is particularly problematic in developing nations where the two-stroke engine is widely used in personal transportation applications. Finally, these land-based platforms also pollute the soil, and consequently the groundwater, when they discharge oil and fuel onto the ground. The negative impacts of such pollution on the environment as well as humans and animals are well-documented. Consequences associated with such pollution include, but are not limited to, respiratory distress, aquatic toxicity and mutagenicity.

The multitude of problems induced by the operation of two-stroke engines has not gone unnoticed. The manufacturers and users of such engines have come under substantial pressure, from regulatory agencies, environmental groups, and the like to severely restrict, if not cease all together, the manufacture and/or use of two-stroke engines. For example, the use of such engines has been banned in at least some national parks. Further, it appears that actions such as use bans and the like are likely to become increasingly commonplace as the protest against the use of two-stroke engines gains momentum.

In response to such pressures, and in an effort to preserve the viability of two-stroke engine based applications, industry has made a number of attempts to resolve the pollution problems inherent in two-stroke engines. As discussed below however, unacceptable costs and/or drawbacks are associated with virtually all of these attempts.

One such attempt at managing two-stroke engine exhaust emissions has focused on improving the performance characteristics of small four-stroke engines in an attempt to adapt these four-stroke engines for at least some of the typical two-stroke engine applications. In particular, attempts have been made to implement a multiple valve arrangement in small four-stroke engines, such as has been done with four-stroke engines used in transportation applications. While arguably improving performance to some degree, such arrangements have increased the complexity of the modified four-stroke engines and have done little or nothing to reduce their weight. Thus, the relatively high PWR that is characteristic of two-stroke engines has not been preserved in these modified four stroke engines. As discussed earlier, a high PWR is critical for high performance lightweight vehicles such as snowmobiles, motor strokes, mopeds, lawn trimmers, lawn mowers, and the like.

Still other attempts to reduce and/or control emissions from two-stroke engines have been directed towards modifications of the process and devices used to introduce fuel into the cylinder. One such approach is commonly known as direct fuel injection (DFI). In contrast with more conventional two-stroke engines, a DFI two-stroke engine directly and independently directs fuel into the cylinder, rather than using the crankcase as a scavenging pump to draw oil and fuel from the carburetor to the cylinder. When properly designed and implemented, DFI systems have proven to be somewhat successful in reducing the emissions of two-stroke engines.

Any success achieved with DFI engines has come with significant attendant costs however. For example, the fuel injection components, such as the fuel pump, fuel injectors, sensors and electronic controls, add significantly to the manufacturing cost and thus the end cost of a two-stroke engine so modified. Additionally, the additional parts introduce a significant measure of mechanical complexity to the two-stroke engine. Because of the aforementioned additional complexity and cost, two-stroke engines utilizing DFI technology are not well suited to satisfy the ongoing demand for an inexpensive engine with a high PWR.

Other attempts to reduce and/or minimize heavy hydrocarbon emissions from two-stroke engines have focused on various reformulations of the fuel typically utilized by those engines. Generally, most of the alternative fuels comprise either ethanol or ethanol-gasoline blends in various proportions. One benefit of such fuel blends is that the discharge of aromatic hydrocarbons is significantly reduced. Unfortunately, there is a tradeoff associated with such a reduction. In particular, such fuel blends typically combust to produce an exhaust characterized by a relatively high amount of formaldehyde. Formaldehyde is a pollutant and its toxic effects, on aquatic environments in particular, are well known. Thus, it is a characteristic of these alternative fuel blends that a tradeoff is produced between emitting one type of pollutant versus another type of pollutant. Even if alternative fuel blends proved viable, it is likely that they would be of only limited availability in remote areas. This is a critical shortcoming in view of the environments in which two stroke engines are often employed, e.g., backcountry forests (as in the case of snowmobiles), remote lakes and remote ocean locations (as in the case of watercraft), and developing countries. In view of the foregoing, it appears that alternative fuel blends are not, at the present time, a highly viable solution to the emission problems characteristic of two-stroke engines.

At least one other attempt to manage exhaust emissions from two-stroke engines has focused on catalytic converter technology. Generally, a catalytic converter operates as an afterburner, burning hydrocarbon exhaust within the converter so that the exhaust is converted to carbon dioxide, carbon monoxide and water. However, catalytic converters are not well suited for use with two-stroke engines because they are prone to fouling and running hot under the high hydrocarbon loads that are characteristic of two-stroke engine operating conditions. Furthermore, catalytic converters have a finite life span and therefore several different converters may be consumed during the lifetime of an engine, thereby increasing the operational costs associated with the engine. Finally, because catalytic converters typically use precious metals to effectuate the conversion process, the converters tend to be relatively expensive.

DESCRIPTION OF THE INVENTION

The present invention has been developed in response to the current state of the art, and in particular, in response to these and other problems and needs that have not been fully or completely solved by currently available two-stroke engine exhaust systems. Thus, it is an overall object of the present invention to effectively resolve at least the problems and shortcomings identified herein. In particular, it is an object of the present invention to provide an exhaust system that materially reduces the emissions of heavy hydrocarbons by two-stroke engines without materially compromising the performance of the engine. It is also an object of the present invention to provide an exhaust system that is mechanically simple and can be readily retro-fitted to existing two-stroke engines. Finally, it is an object of the present invention to provide an exhaust system that is relatively light in weight and inexpensive.

In summary, the foregoing and other objects, advantages and features are achieved with an improved exhaust system for use in materially reducing heavy hydrocarbon emissions from internal combustion engines. Embodiments of the present invention are particularly suitable for use with two-stroke engines and the like.

In one embodiment, the improved exhaust system includes a vortex tube having a chamber in communication with the exhaust manifold of a two-stroke engine. The vortex tube includes an exhaust inlet connection and two gas outlet connections preferably in communication with the atmosphere. The opening of at least one of the gas outlet connections is adjustable so that the volume of gas exiting the vortex tube through that gas outlet connection may be varied as required to suit a particular application. The vortex tube further includes a liquid outlet connection to facilitate removal of separated liquids from the chamber. In one embodiment, the liquid connection of the vortex tube is in communication with the fuel intake line of the two-stroke engine. Finally, the vortex tube includes a nozzle assembly so arranged that exhaust entering the chamber by way of the exhaust inlet connection must first pass through the nozzle. The nozzle assembly preferably includes a nozzle having at least one inlet aperture tangentially oriented with respect to the diameter of the nozzle. Preferably, the inlet aperture has an available inlet area that varies in response to changes in the pressure of the exhaust. In a preferred embodiment, the available inlet area is varied by way of a resilient member, such as a spring, which is so arranged as to cause a blockage of a predetermined portion of the inlet aperture and thereby define the available inlet area, wherein the extent of the blockage corresponds to the pressure of the exhaust stream. By thus effectuating definition of the available inlet area, the resilient member facilitates control of the flow of exhaust through the nozzle.

In operation, an exhaust stream from the two-stroke engine initially enters the nozzle through the exhaust inlet connection. The tangentially arranged inlet apertures of the nozzle serve to impart a high velocity cyclonic, or rotational, motion to the exhaust stream so that the exhaust stream rotates as it passes down the vortex tube. Because of the high velocity of the cyclonic flow, the heavier liquid components of the exhaust stream are thrown to the periphery of the chamber defined by the vortex tube where they can be drawn off through the liquid connection. Preferably, at least a portion of the liquid components so separated are routed back to the cylinder for burning.

The remaining gaseous components of the exhaust stream exit the vortex tube through the gas outlet connections. In a preferred embodiment, a relatively cooler gaseous component exits the vortex tube through one of the gas outlet connections, and a relatively warmer gaseous component exits the vortex tube through the other gas outlet connection.

The present invention thus has among its various desirable features, the ability to separate out from gaseous components of the exhaust, relatively heavier components such as unburned fuel, oil, and/or other heavy hydrocarbons, which can then be routed back to the cylinder for burning. Consequently, emission of unburned heavy hydrocarbons by the two-stroke engine is substantially reduced, and fuel efficiency is improved since a much greater percentage of the fuel provided to the engine is burned. Further, because the nozzle through which exhaust is introduced to the vortex tube has an inlet aperture whose available inlet area is responsive to changes in the pressure of the exhaust stream produced by the two-stroke engine, the exhaust system is able to effectuate a high level of separation of liquid components of the exhaust stream even under varying exhaust stream pressures.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and features of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF THE INVENTION

Reference will now be made to figures wherein like structures will be provided with like reference designations. It is to be understood that the drawings are diagrammatic and schematic representations of various embodiments of the invention, and are not to be construed as limiting the present invention in any way.

In general, the present invention relates to an improved exhaust system for use in conjunction with a two-stroke internal combustion engine. FIGS. 1A through 3C indicate various embodiments of an exhaust system conforming to the teachings of the invention.

Figure 1A:
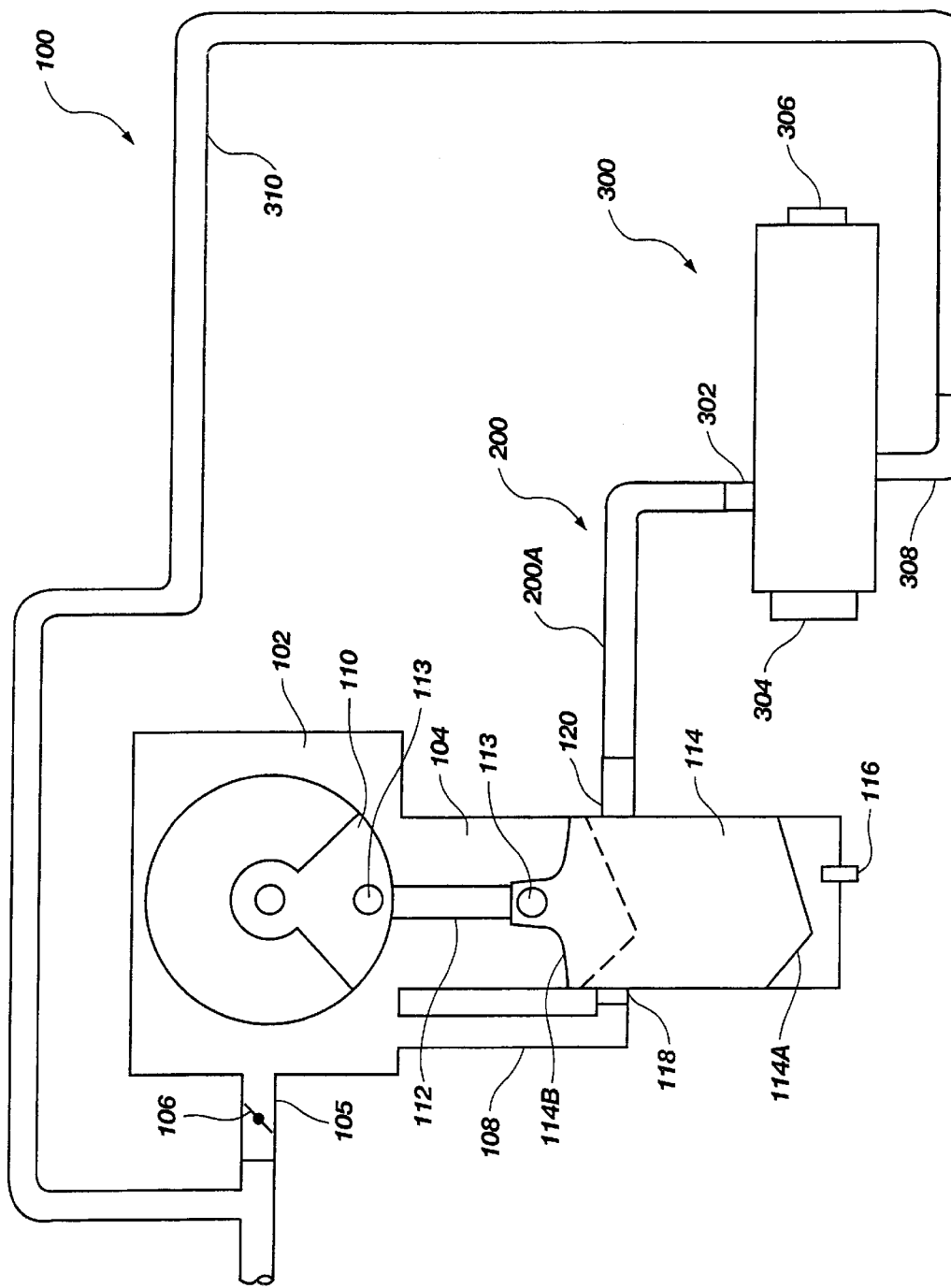
FIG. 1A depicts one embodiment of an engine with an exhaust system in accordance with the teachings of the present invention.

Reference is first made to FIG. 1A, wherein an embodiment of an engine is indicated generally at 100. In a preferred embodiment, engine 100 comprises a two-stroke internal combustion engine. However, it will be appreciated that embodiments of the present invention may be profitably employed in the context of four stroke or any other type of internal combustion engines, including, but not limited to, two and four-stroke heavy transportation diesels, large marine engines, and compressor and generator engines as well as four-stroke passenger vehicles.

Engine 100 includes an exhaust system 200 having a separator 300. Engine 100 further includes a crankcase 102 in communication with a cylinder 104. Crankcase 102 includes a fuel inlet connection 105 having disposed therein a check valve 106 to permit flow of fuel, air, and oil into crankcase 102, but substantially preventing back flow from crankcase 102.

It will be appreciated that induction of fuel, air, and oil into crankcase 102 may be accomplished by way of a variety of devices and structures other than check valve 106. For example, the functionality of check valve 106 may alternatively be provided by a reed valve, or the like. Accordingly, the present invention should not be construed as limited solely to engines 100 wherein crankcase induction is accomplished or controlled by way of a check valve.

A fuel line 108 facilitates flow of fuel, oil, and air from crankcase 102 to cylinder 104. Disposed in crankcase 102 is a rotating member 110 pinned, by way of rod 112 and pins 113, to a piston 114 disposed in cylinder 104. Piston 114 includes an upper compression surface 114A and a lower compression surface 114B.

As further indicated in FIG. 1A, cylinder 104 further includes a spark plug 116 disposed at the top of cylinder 104, a fuel inlet connection 118, and an exhaust outlet connection 120. Exhaust outlet connection 120 of cylinder 104 communicates with an exhaust inlet connection 302 of separator 300 by way of an exhaust line 200A (which includes a header pipe 202, diverging cone 204, midsection 206, converging cone 208, and stinger, or transfer pipe, 210—see FIG. 1B). Separator 300 further includes a cold gas outlet 304, a hot gas outlet 306, and a liquid outlet connection 308 connected to a fuel recycle line 310 in communication with fuel inlet connection 105. Note that the terms "cold" gas outlet and "hot" gas outlet are intended to refer to a relative temperature differential between the gas streams flowing from the respective outlets.

The operation of engine 100 and exhaust system 200 proceeds generally as follows. In general, two-stroke engines are characterized by a combustion stroke and a compression stroke. Reference will first be made to the combustion stroke. Initiated by spark plug 116, combustion of a mixture of air, gas, oil and/or other fuels and lubricants (hereinafter the "fuel mixture") in cylinder 104 exerts a force on upper compression surface 114A of piston 114, driving piston 114 downward in cylinder 104. Because rod 112 is rotatably pinned to rotating member 110 and piston 114, and can thus be retracted or extended, the downward motion of piston 114 can be readily accommodated. The same is likewise true with regard to subsequent upward motion of piston 114 in cylinder 104. Typically, rotating member 110 is connected to an output shaft (not shown), so that the reciprocating motion of rotary member 110 causes the output shaft to rotate.

As piston 114 moves downward, lower compression surface 114B serves to compress the fuel mixture that was pulled into crankcase 102 during the previous upward stroke of piston 114. Check valve 106 prevents the compressed mixture from escaping crankcase 102 during compression. As piston 114 moves downward, exhaust outlet connection 120 is uncovered so that the pressurized exhaust produced by the combustion of the fuel mixture escapes from cylinder 104. Immediately thereafter, piston 114 reaches its point of maximum downward travel, that is, where upper compression surface 114A assumes the position indicated by the phantom line in FIG. 1A, and fuel inlet connection 118 is then uncovered so that the compressed fuel mixture flows into cylinder 104. As is well known, the substantially simultaneous inflow of fuel mixture and outflow of exhaust causes at least some of the fuel mixture to exit cylinder 104 unburned with the exhaust.

The exhaust stream from cylinder 104 is then directed from exhaust outlet connection 120 to separator 300 by way of exhaust line 200A and exhaust inlet connection 302 of separator 300. It will be appreciated that the pressure of the exhaust stream exiting cylinder 104 varies largely according to the rate of rotation of the crankshaft of engine 100, that is, the revolutions per minute (rpm) of the engine. In general, a relatively greater rpm implicates a relatively greater exhaust pressure. It will be appreciated that other variables, including, but not limited to, engine load, may also affect the pressure in the exhaust system.

As discussed in greater detail below, separator 300 serves to separate, or resolve, at least a portion of one or more liquid components of the exhaust stream for processing. As contemplated by the present invention, "processing" includes, but is not limited to, returning the separated liquid components to crankcase 102 by way of fuel recycle line 310, for compression and subsequent combustion. It is thus an important feature of the present invention that exhaust system 200, by way of separator 300, is able to effectively and substantially resolve one or more liquid components of an exhaust stream of varying pressure without materially compromising the performance of engine 100. By returning the separated liquid components of the exhaust produced by engine 100 to cylinder 104 for combustion, the emission of heavy hydrocarbon pollutants such as oil and gas is dramatically reduced, while at the same time, the fuel efficiency of 100 is improved since the liquid components of the exhaust are separated and burned rather than simply discharged to the atmosphere. It will be appreciated that processing of the liquid component(s) thus resolved by separator 300 may alternatively comprise directing one or more of the separated liquid components to a reservoir (not shown) or the like for collection and future disposal.

Note that while separator 300 is preferably employed with an exhaust system 200 of a two-stroke internal combustion engine, it will be appreciated that separator 300 may be used in any context where it is desired to separate one or more liquid components of a variable pressure process stream having both liquid and gaseous components. Such applications are accordingly contemplated as being within the scope of the present invention.

While one or more liquid components of the exhaust stream are preferably directed back to cylinder 104 for combustion, gaseous components of the exhaust stream preferably exit separator 300 by way of cold gas outlet 304 and/or hot gas outlet 306. In a preferred embodiment, cold gas outlet 304 and/or hot gas outlet 306 are in communication with the atmosphere. As discussed below however, it will be appreciated that gas from either or both of these outlets may be captured for further processing or other use prior to discharge to the atmosphere.

Finally, while the embodiment of exhaust system 200 depicted in FIG. 1A indicates a single separator 300, it will be appreciated that a plurality of separators 300 may be employed so as to achieve a desired result with respect to resolution of one or more liquid components of the exhaust stream. Alternatively, one or more separation steps may be effectuated serially with a single separator 300. For example, hot gas exiting separator 300 from hot gas outlet 306 may be reintroduced to separator 300 so as to effectuate further separation of any remaining liquid components in the hot gas.

With continuing attention now to the operation of two-stroke engine 100, the compression stroke of two-stroke engine 100 is described in additional detail. Once the fuel mixture has flowed into cylinder 104 and the exhaust has escaped from cylinder 104, the combustion stroke has been completed and the compression stroke begins. Due to momentum imparted to it by the downward travel of piston 114, rotating member 110 continues to rotate so as to drive piston 114 back up in cylinder 104. As it moves upward in cylinder 104, piston 114 compresses the fuel mixture in cylinder 104, simultaneously covering fuel inlet connection 118 and exhaust outlet connection 120 so that the compressed fuel mixture cannot escape. At substantially the same time, the upward motion of piston 114 causes a fresh charge of fuel mixture to be sucked into crankcase 102 through fuel inlet connection 105. This fresh charge is prevented from entering cylinder 104 because, as previously noted, fuel inlet connection 118 is covered by piston 114 as piston 114 moves upward. When piston 114 reaches its point of maximum upward travel, defined by the length of rod 112, the compression stroke is completed. The compressed fuel mixture is then ignited by spark plug 116, and the combustion stroke begins again.

Figure 1B:
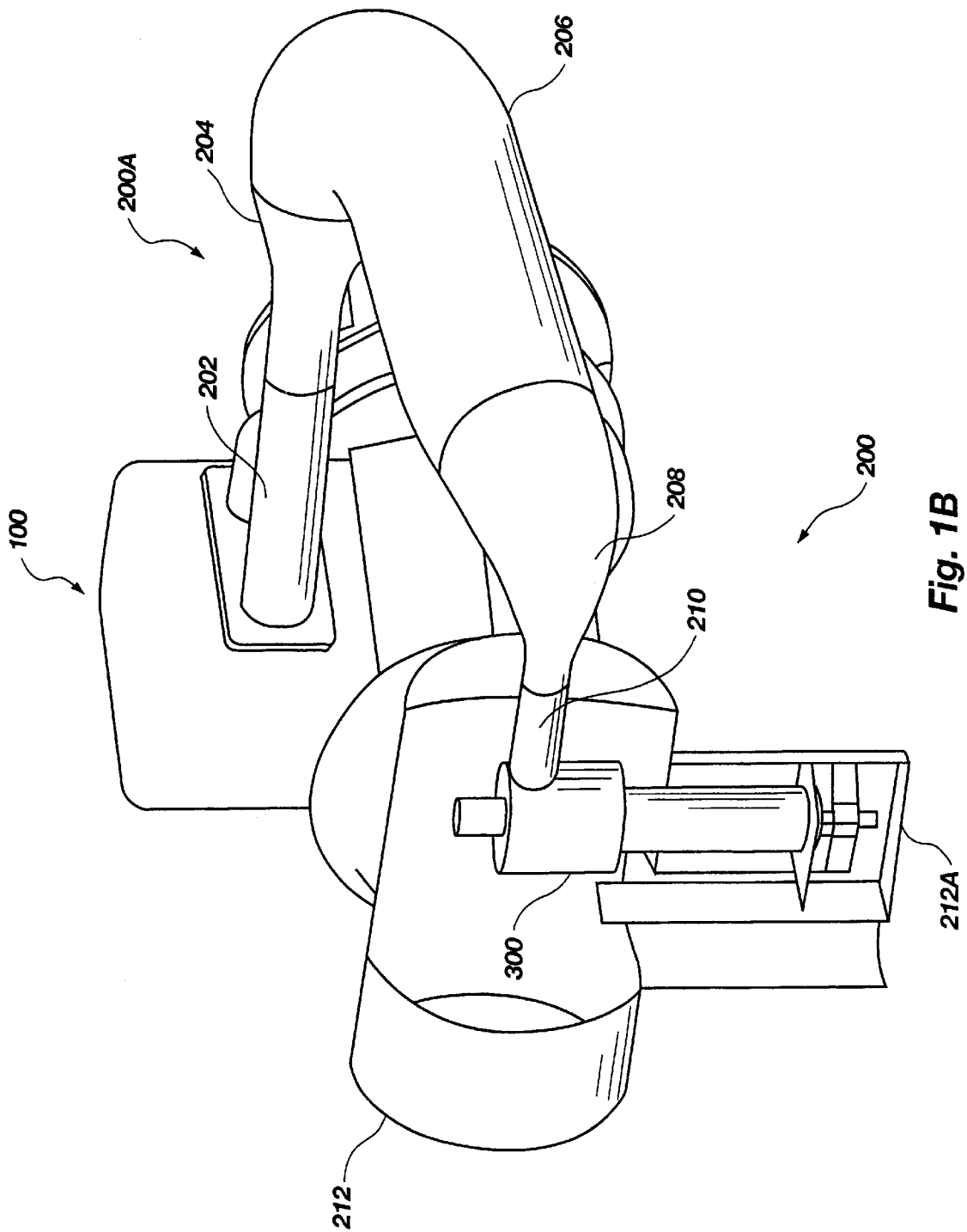
FIG. 1B depicts various details of an embodiment of an exhaust system according to the present invention.

Directing attention now to FIG. 1B, additional details regarding an embodiment of an exhaust system in accordance with the teachings of the present invention are indicated. In particular, exhaust system 200 of engine 100 includes an exhaust line 200A having a header pipe 202 in communication with engine 100. Diverging cone 204, midsection 206, and converging cone 208 are likewise in communication with engine 100. A stinger, or transfer pipe, 210 connects converging cone 208 with separator 300 of muffler 212. Muffler 212 includes at least one outlet 212A through which the exhaust passes after processing by separator 300 (discussed below). However, it will be appreciated that muffler 212 may include multiple outlets as required to suit particular uses and applications of separator 300, and/or to achieve one or more desired results or effects.

In one embodiment, stinger 210 is eliminated and separator 300 is connected directly to converging cone 208. While not specifically indicated in FIG. 1B, muffler 212 is well known in the art to include baffles so as to facilitate attenuation of exhaust system noise and/or engine noise.

While separator 300 preferably comprises an element of muffler 212, as indicated in FIG. 1B, it will be appreciated that separator 300 may be located elsewhere in the exhaust system and/or combined with various other components as/if necessary to produce a desired result or effect. For example, one of skill in the art will appreciate that separator 300 could be profitably employed in conjunction with an exhaust resonance chamber such as is commonly found in many exhaust systems.

As the operational details of an exhaust system 200 such as that depicted in FIG. 1B (with the exception of separator 300 and its operational and performance implications, discussed elsewhere herein) are well known, no discussion thereof is presented here. It is sufficient to note at this juncture that the components of exhaust system 200 are typically arranged and constructed to perform over a variety of operating conditions and that separator 300 performs its various functions, discussed in detail elsewhere herein, without materially compromising the performance of either exhaust system 200 or engine 100.

Figure 2A:
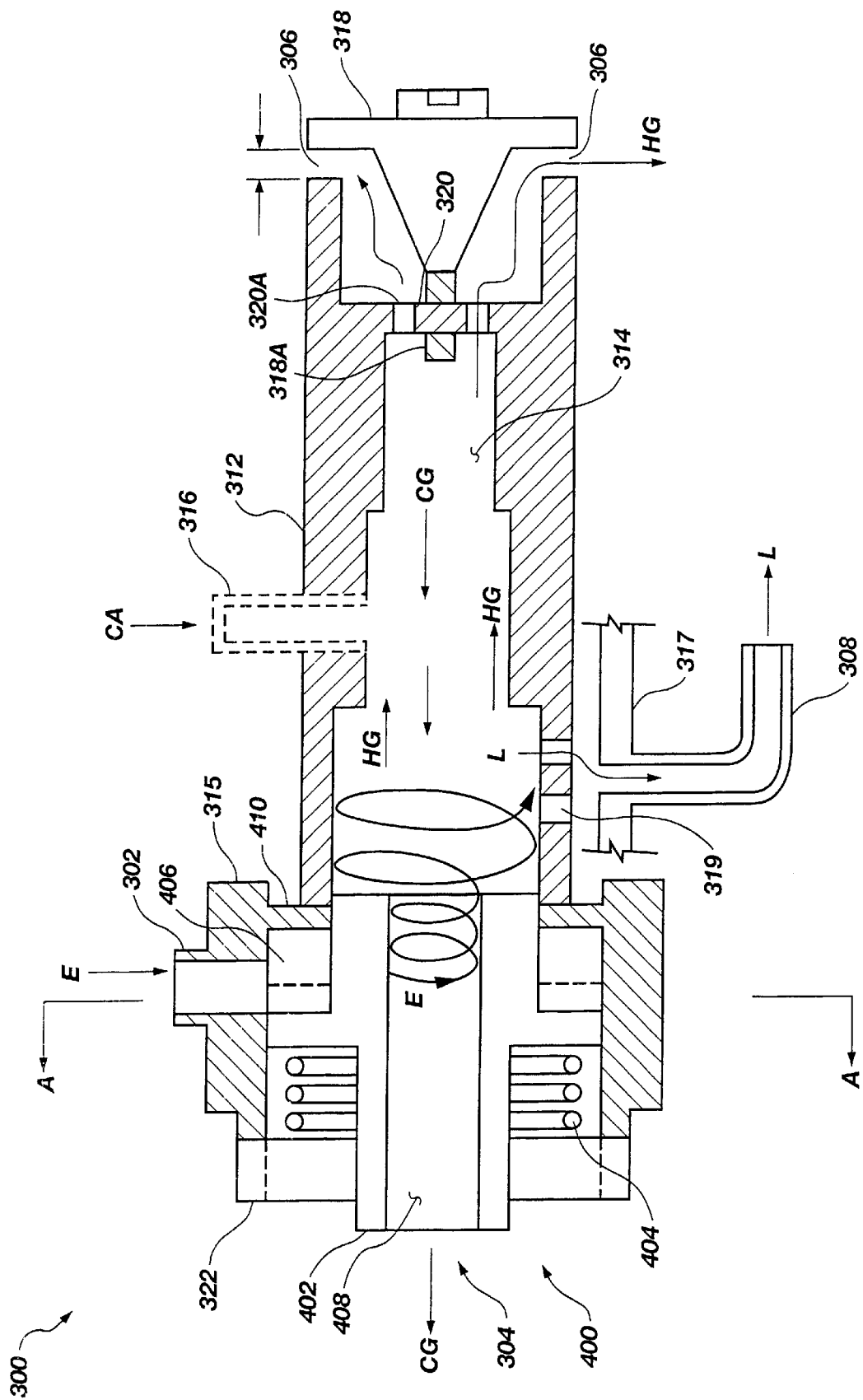
FIG. 2A is a section view depicting various details of embodiments of a nozzle assembly with a variable aperture nozzle, and vortex tube in accordance with the teachings of the present invention.

Directing attention now to FIG. 2A, additional details regarding the structure and operation of separator 300 are provided. In a preferred embodiment, separator 300 comprises a vortex tube, however, it will be appreciated that various other structures and/or devices may be employed to provide the functionality, disclosed herein, of separator 300. Preferably, separator 300 is made of carbon steel or other mild steel. However, any material, or combination of materials, compatible with the functions and operation of engine 100, exhaust system 200, and separator 300 is contemplated as being within the scope of the present invention.

Separator 300 includes a body 312 defining a chamber 314 abutted by, and in flow communication with, a nozzle housing 315. A liquid outlet connection 308 of a collection well 317 substantially surrounding body 312 facilitates collection and processing of one or more separated liquid component(s), denoted "L", flowing out of chamber 314 by way of perforations 319. It will be appreciated however, that the fluid exiting perforations 319 may be collected in a variety of other ways as well.

As further indicated in FIG. 2A, a step formed on the inside of body 312 proximate to perforations 319 substantially prevents flow of separated liquids from exiting chamber 314 other than through perforations 319. It will be appreciated that perforations 319 may be distributed around the entire perimeter of body 312, or alternatively, around only a portion of the perimeter of body 312. Variables such as, but not limited to, the number, size, and shape of perforations 319 may be adjusted as required to suit a particular application and/or to achieve one or more desired effects. Alternatively, various other types of outlets and/or outlet connections may profitably be substituted for perforations 319 as/if required to suit a particular application and/or to facilitate achievement of one or more desired results.

In a preferred embodiment, a combustion air inlet 316, denoted "CA", is likewise disposed so as to be in communication with chamber 314. A throttle body 318 disposed at one end of chamber 314 permits control of the flow of hot gas(es), denoted "HG", from chamber 314. Throttle body 318 preferably includes a threaded shaft 318A, engaged in a support structure 320 disposed in chamber 314. Support structure 320 includes a plurality of perforations 320A to facilitate flow of gas or other components from chamber 314 through hot gas outlet 306. As suggested in FIG. 2A, rotation of throttle body 318 causes throttle body 318 to either advance or retreat, along threaded shaft 318A, thereby decreasing or increasing, respectively, the size of hot gas outlet 306 so as to facilitate achievement of a desired flow rate therethrough. It will be appreciated that throttle body 318 may be positioned in any number of ways so as to achieve various desired flow conditions.

Disposed proximate to that end of chamber 314 opposite throttle body 318 is a nozzle assembly 400. Nozzle assembly 400 includes a nozzle 402 and at least one resilient member 404, both disposed in nozzle housing 315. A restraining collar 410 serves to limit the range of motion of nozzle 402.

Nozzle 402 defines at least one inlet aperture 406 in communication with exhaust inlet connection 302. As discussed in further detail below, nozzle 402 is preferably circular in shape and inlet aperture(s) 406 are defined in nozzle 402 so as to be disposed in a substantially tangential orientation with respect to a passage 408 of nozzle 402. Additionally, inlet apertures 406 are in communication with passage 408. Passage 408 of nozzle 402 is, in turn, in communication with chamber 314, and is preferably concentric with respect to the longitudinal axis of nozzle 402. It will be appreciated however, that a variety of other orientations of passage 408 may be profitably employed to provide the functionality of nozzle 402, as disclosed herein. Such other orientations are accordingly contemplated as being within the scope of the present invention.

With continuing attention to FIG. 2A, nozzle 402 and resilient member 404 are securely retained in nozzle housing 315 by a nozzle housing nut 322. In a preferred embodiment, resilient member 404 is pre-compressed so as to bias nozzle 402, relative to nozzle housing 315, towards chamber 314. However, it will be appreciated that a variety of arrangements may be employed so as to introduce a bias between nozzle 402 and nozzle housing 315. Arrangements contemplated as being within the scope of the present invention include, but are not limited to, those wherein a bias is imposed on nozzle housing 315 so that nozzle housing 315 moves relative to nozzle 402. It will further be appreciated that the spring constant "k" of resilient member 404 may be varied as desired to achieve a particular effect or result with respect to the performance of separator 300 and nozzle assembly 400. Additionally, note that a variety of other structures and/or devices may be employed to perform the function of resilient member 404, as disclosed herein. For example, the functionality of resilient member 404 may alternatively be achieved with electronic and/or electromechanical control devices, and the operation thereof could be indexed to a variety of operational variables, including, but not limited to, throttle position.

Note that a variety of means may be profitably employed to achieve the functionality collectively provided by nozzle assembly 400. Nozzle assembly 400 is but one example of a means for adjusting the flowrate of exhaust into said chamber in response to changes in exhaust system pressure and for facilitating the substantial resolution of at least a first component of the exhaust stream. Accordingly, the structure disclosed herein simply represents one embodiment of structure capable of performing these functions. It should thus be understood that nozzle assembly 400 is presented solely by way of example and should not be construed as limiting the scope of the present invention in any way.

Figure 2B:
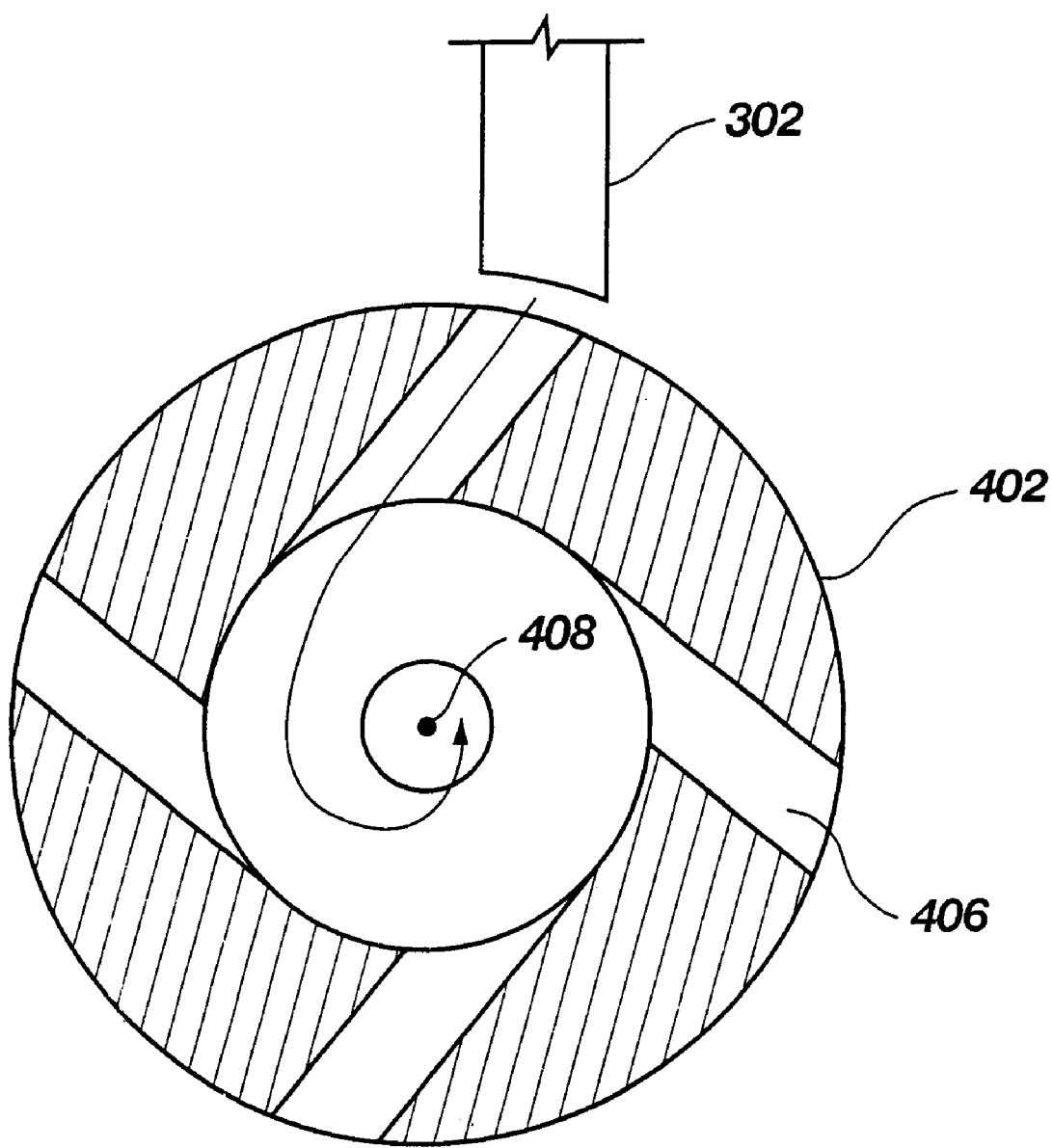
FIG. 2B is a section view taken along line A—A of FIG. 2A and indicating aspects of the relation between the exhaust stream and the nozzle.

With reference now to FIG. 2B, and with continuing reference to FIG. 2A, further details regarding the operation of separator 300 and nozzle assembly 400 are provided. As previously noted, an exhaust stream indicated as "E" in FIG. 2A, from, for example, engine 100 (not shown), enters nozzle housing 315 by way of exhaust inlet connection 302. Alternatively, other variable pressure process streams having both gaseous and liquid components could be processed by separator 300 and nozzle assembly 400. Because inlet aperture 406 of nozzle 402 is tangentially oriented with respect to passage 408, the exhaust entering passage 408 from inlet aperture 406 is caused to rotate at a high rate of speed as it passes into and through chamber 314.

In general, the spin rate of the exhaust passing through chamber 314 is a function of the exhaust pressure. Specifically, a relative increase in exhaust pressure causes a corresponding relative increase in the spin rate of the exhaust passing through nozzle 402 and chamber 314. As previously noted, resilient member 404 biases nozzle 402 towards chamber 314. However, as suggested in FIG. 2A, a relative increase in the pressure of the exhaust stream at least partially counteracts the bias imposed by resilient member 404, causing nozzle 402 to move in a direction away from chamber 314.

It is thus a feature of nozzle assembly 400 that the available inlet area of inlet aperture 406, i.e., the area of inlet aperture 406 in communication with exhaust inlet connection 302 and through which exhaust may pass, varies automatically in response to changes in exhaust system pressure. In particular, as exhaust system pressure increases so as to gradually overcome at least a portion of the bias imposed by resilient member 404, a relatively greater portion of inlet aperture 406 is brought into communication with exhaust inlet connection 302 so as to facilitate an increased rate of exhaust flow through nozzle 402, passage 408 and hence through chamber 314. Accordingly, it will be appreciated that the spin rate of exhaust passing through nozzle 402 and chamber 314 varies in direct correlation to the pressure of the exhaust stream entering exhaust inlet connection 302.

Correspondingly, the bias imposed on nozzle 402 by resilient member 404 serves to ensure that a relative decrease in exhaust pressure decreases the available inlet area of inlet aperture 406, in consonance with the reduced flow of exhaust, so that nozzle 402 assumes, for example, the position indicated by the phantom lines in FIG. 2A.

Thus, not only is nozzle assembly 400 sensitive to changes in the exhaust pressure, but nozzle assembly 400 automatically and substantially instantaneously adjusts its response accordingly.

In particular, by virtue of the automatic adjustment of nozzle 402 to respond to varying pressure conditions in the exhaust stream, separator 300 is able to maintain an optimum spin rate in nozzle 402, and correspondingly, an optimum pressure ratio of the exhaust system back pressure to the atmospheric pressure. By thus maintaining a predetermined optimum pressure ratio, separator 300 is able to readily effectuate substantial separation of one or more liquid components of the exhaust stream under a wide range of pressure conditions without materially impairing the performance of engine 100 or exhaust system 200 (not shown). Finally, those of skill in the art will appreciate that because it varies exhaust system back pressure so as to maintain an optimum pressure ratio, nozzle assembly 400 serves to expand the power band of engine 100 (not shown).

Note that in an alternative embodiment, adjustment of nozzle assembly 400 occurs in response to manual input transmitted to the nozzle assembly. For example, the manual input may be transmitted, at least indirectly, to the nozzle assembly by way of a throttle cable, or the like, at least indirectly connected to nozzle 402 and/or nozzle housing 315 so that changes in throttle cable position, manually imposed by the operator of the engine, cause a corresponding response by nozzle assembly 400.

The aforementioned are particularly valuable characteristics in the context of internal combustion engines, as it is well known that the exhaust pressure generated by an internal combustion engine may vary widely over the range of operating conditions to which such engines are typically exposed. For example, the exhaust pressure of a snowmobile engine at idle speed is significantly lower than it would be if the snowmobile is traveling at high speed or up a steep incline.

With continuing reference to FIG. 2A, additional details are provided regarding the operation of separator 300 and nozzle assembly 400. As previously noted, nozzle 402 imparts a high rotational speed to the exhaust, denoted "E", as the exhaust passes through passage 408, inlet apertures 406, and enters chamber 314. The rates of rotation thus imparted can reach levels as high as 1,000,000 revolutions per minute (rpm). As a result of this high rate of rotation, significant centrifugal forces, as high as 10,000 Gs, are realized which serve to throw the heavier liquid components of the exhaust stream to the periphery of chamber 314. Additionally, it is well known in the art that it is a characteristic of vortex tubes that because they allow the pressurized gas to expand, the vortex tube facilitates at least some condensation of vapor present in the stream being fed therethrough. Thus, the vortex tube both promotes condensation of vapor in the exhaust stream, due to rapid gas expansion in the vortex tube, as well as separating liquid components by way of centrifugal forces. It will be appreciated that the geometric aspects, including but not limited to, the length and/or diameter, of separator 300 and chamber 314 may be varied as required to suit a particular application or to facilitate achievement of a desired result.

The high rotational speeds imparted to the exhaust flow are another valuable feature of the present invention. Not only do the high rotational speeds contribute materially to effective separation of the liquid component(s) of the exhaust stream, but the high centrifugal forces and rotational speed ensure that the operation of separator 300 is not materially affected by a change in its physical orientation. This is a particularly valuable feature in two-stroke applications such as snowmobiles and personal watercraft, which typically experience a wide range of speeds, motions, and orientations.

The liquid thus separated can then be collected and drawn off by way of liquid outlet connection 308 for processing. Where all or a portion of the separated liquid is to be returned to the engine, it will be appreciated that this may be achieved in a variety of ways. In a preferred embodiment, the liquid is routed to a connection point upstream of the oil pump (not shown) and then returned to the engine by the oil pump. Such an arrangement is particularly well-suited for applications where a majority of the collected liquid is oil. Alternatively, the collected liquid may be returned to the fuel system at a point upstream of the fuel pump. In either event, the aforementioned arrangements desirably facilitate regulation and control of the flow of the separated liquid(s) back into the engine combustion system.

In yet another alternative embodiment, the separated liquid may be routed back to the engine directly, bypassing the fuel and oil pumps. This is due to the fact that the pressure inside chamber 314 of separator 300 is typically somewhat higher than the atmospheric pressure at which the oil and gas reservoirs (not shown) and the carburetor (not shown) operate.

In addition to separating liquid components of the exhaust stream, separator 300 also serves to produce at least two gas streams of disparate temperature. In particular, it is well known that separators such as the embodiment depicted in FIG. 2A tend to produce a stream of relatively colder gas, denoted "CG", in the central portion of chamber 314, and a relatively hotter gas stream, denoted "HG", at the periphery of chamber 314. Because of this characteristic separation of the hot and cold gas streams, hot gas can be directed through one end of separator 300 and the cold gas flow can be directed through another end of separator 300, as suggested in FIG. 2A. As previously suggested, one or both of these gas flows may be returned to separator 300 for further processing, as/if required, to suit a particular application and/or to achieve a desired result. Thus, it will be appreciated that the present invention is effective in separating, for example, relatively heavier gaseous hydrocarbon exhaust components from relatively lighter gaseous hydrocarbon exhaust components.

Figure 2C:
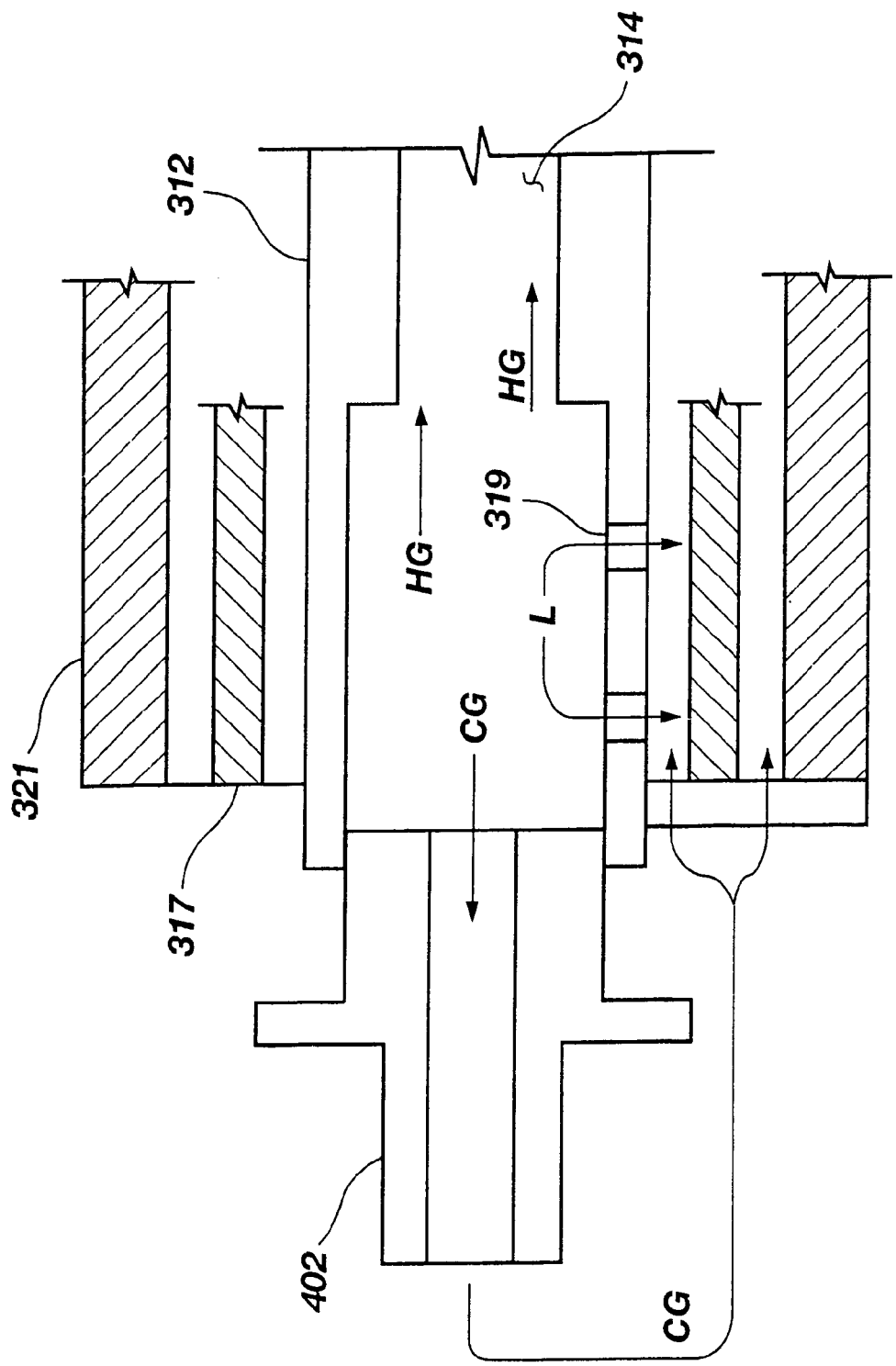
FIG. 2C depicts various details of an embodiment of a separator configured to permit cold gas cooling of separated liquid.

Note that in one embodiment, various details of which are indicated in FIG. 2C, the cold gas stream may be employed to enhance the functionality of separator 300. In particular, all, or a portion of the cold gas exiting nozzle 402 is directed back to the interior of collection well 317 so as to substantially prevent separated liquid "L" from flashing into vapor, that is, to ensure liquid "L" remains in liquid form. The flow of cold gas may be directed back to cooling jacket 321 and/or collection well 317 by way of, for example, a system comprising tubing, fittings, piping, valves, and related devices and components well known in the art.

It will be appreciated that one or more parameters of the cold gas flow may be varied as required to achieve one or more desired cooling effects, wherein such parameters include, but are not limited to, temperature, flow rate, and pressure. As suggested elsewhere herein, at least the flowrate of the cold gas can be adjusted, at least indirectly, by way of throttle body 318.

In an embodiment employing only collection well 317, collection well 317 includes a cold gas inlet and separate cold gas, and liquid, outlets so that liquid collected from chamber 318 can be drained from the liquid outlet, and the cold gas discharged from the cold gas outlet. In such an embodiment, the cold gas outlet is preferably in communication with the atmosphere.

In an alternative embodiment, a cooling jacket 321 is disposed around collection well 317 and the cold gas diverted through the cavity defined between cooling jacket 321 and collection well 317. In this embodiment, cooling jacket 321 includes a cold gas inlet and cold gas outlet through which the cold gas stream can be directed, and discharged, respectively.

Preferably, collection well 317 and cooling jacket 321 comprise metallic cylinders substantially concentric with separator 300. However, any other structure, or combinations thereof, and/or materials, that provide the functionality of collection well 317 and cooling jacket 321 are contemplated as being within the scope of the present invention.

Finally, it will be appreciated that embodiments of the present invention are well suited to separate particulate matter from a process stream, or exhaust gas. As with liquid components of the exhaust stream, the particulates may be returned to the engine for combustion, or collected for future disposal, or processed in some other manner.

With continuing reference to FIG. 2A, it has been suggested herein that an alternative embodiment of separator 300 would profitably employ a combustion air inlet for directing a flow of combustion air, denoted "CA", into chamber 314. In particular, the combustion air inlet 316 is preferably located on separator 300 at a point downstream, with respect to the flow of exhaust through chamber 314, from that point at which condensed liquids have been collected from chamber 314. In this way, combustion air introduced through combustion air inlet 316 facilitates combustion of unburned fuel in an otherwise oxygen deprived environment, that is, in chamber 314, without compromising the efficient separation of liquid components of the exhaust stream. Thus, this embodiment of separator 300 includes liquid separation functionality as well as after-burning functionality, with the first portion of chamber 314 serving as the liquid separation and collection zone, and the remaining portion of chamber 314 serving the after-burning function by facilitating the combination of combustion air with unburned exhaust gases. It will be appreciated that the location, size, geometry, and/or numbers of combustion air inlet 316 may be varied as required to suit a particular application and/or to achieve a desired result.

Finally, in alternative embodiments, the centrifugal liquid separation function of separator 300 is supplemented, or replaced entirely, by an electrostatic separation feature. In particular, body 312 of separator 300 is oppositely electrically charged with respect to the exhaust gas passing through chamber 314. The difference in charge causes separator 300 to act as an electrostatic precipitator. This mode of operation is particularly valuable in those instances where the liquid droplets of hydrocarbons present in the exhaust stream are too small to be effectively removed by the centrifugal action imparted by nozzle 402.

Figure 3C:
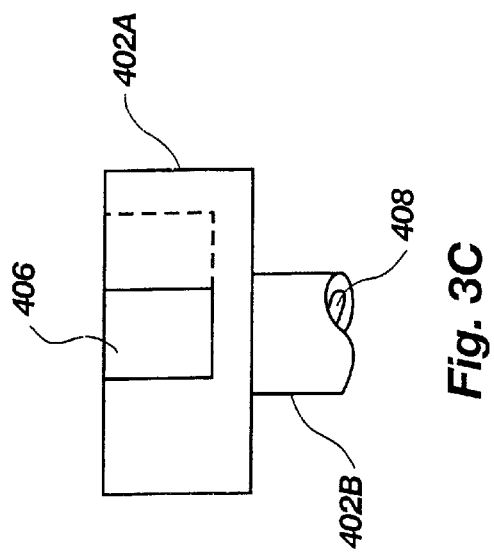
FIG. 3C is a side view, taken along line C—C of FIG. 3B; indicating additional details of an embodiment of a variable aperture nozzle in accordance with the teachings of the present invention.
Figure 3B:
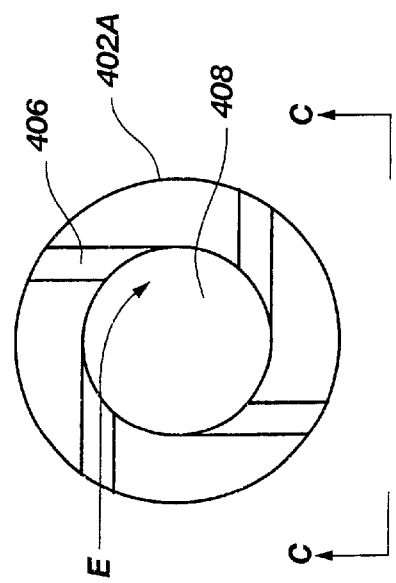
FIG. 3B is a top view, taken along line B—B of FIG. 3A, of an embodiment of a variable aperture nozzle depicting a preferred aperture arrangement.
Figure 3A:
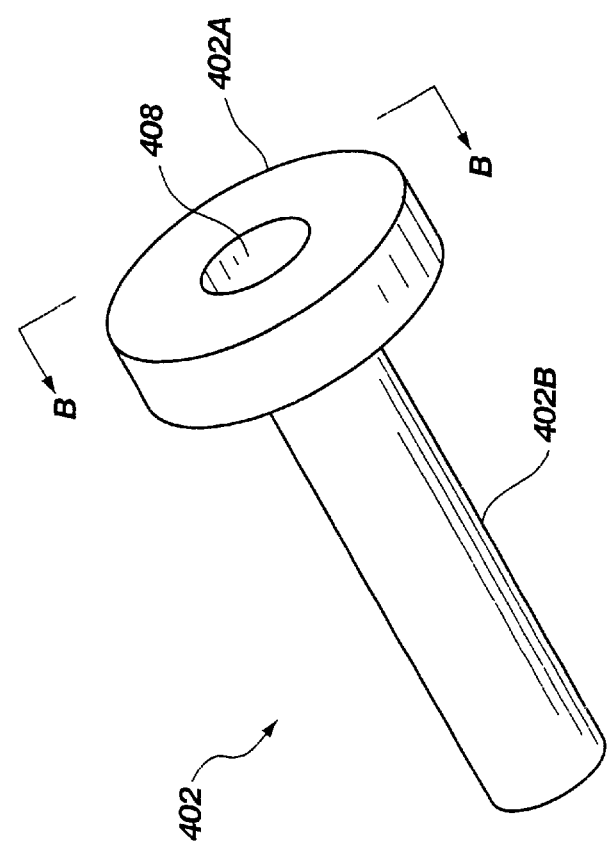
FIG. 3A is a perspective view of one embodiment of a variable aperture nozzle.

Directing attention now to FIGS. 3A through 3C, additional details are provided regarding the structure of one embodiment of a nozzle 402. As suggested in FIG. 3A, nozzle 402 includes a nozzle disc 402A which cooperates with nozzle body 402B to define a passage 408. Preferably, nozzle disc 402A is integral with nozzle body 402B. In one embodiment, nozzle 402 comprises mild steel or other material which can withstand the high temperatures involved. However, it will be appreciated that a wide variety of materials may be profitably employed to provide the functionality of nozzle 402, as disclosed herein.

As previously discussed, and as indicated in FIG. 3B, nozzle disk 402A includes a plurality of inlet apertures 406 in communication with passage 408. Preferably, inlet apertures are oriented tangentially with respect to passage 408. However, it will be appreciated that variables including, but not limited to, the number, size and orientation of inlet apertures 406 may either be varied individually or collectively so as to facilitate achievement of one or more desired results.

As suggested in FIG. 3B, inlet apertures 406 cooperate with passage 408, to impart a substantially rotational motion to the exhaust stream denoted as "E". Finally, FIG. 3C depicts a side view of one embodiment of a nozzle disc 402A, and indicates an inlet aperture 406 and passage 408.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a system producing at least one process stream of varying pressure, a separator for facilitating management of components of the at least one process stream, the separator comprising:

a body defining a chamber;

a nozzle housing;

an exhaust inlet connection in flow communication with said nozzle housing and said chamber; and a nozzle assembly substantially disposed in said nozzle housing so that said process stream entering said exhaust inlet connection passes through at least a portion of said nozzle assembly and into said chamber, said nozzle assembly configured to adjust flowrate of said process stream into said chamber in response to changes in process stream pressure and to impart a substantially rotational motion to said process stream passing into said chamber so as facilitate substantial resolution of at least a first component of said process stream.

2. The separator of claim 1, wherein said adjustment of process stream flowrate by said nozzle assembly occurs substantially responsive to a change in process stream pressure.

3. The separator of claim 1, wherein said at least first component is substantially in liquid form.

4. The separator of claim 1, wherein said at least first component substantially comprises particulates.

5. The separator of claim 1, wherein said nozzle assembly comprises:

a nozzle in flow communication with said inlet connection and said chamber so that said process stream entering said inlet connection passes through said nozzle into said chamber, and said nozzle having at least one inlet aperture, said at least one inlet aperture configured to impart substantially rotational motion to said process stream entering said chamber so as to facilitate said substantial resolution of said first component of said process stream; and at least one resilient member disposed in operative relation between said nozzle and said nozzle housing so as to automatically facilitate relative changes of position between said nozzle and said nozzle housing in response to corresponding changes in process stream pressure, said relative change in position of said nozzle at least indirectly facilitating said adjustment of said flowrate of said process stream into said chamber.

6. The separator of claim 1, wherein said separator produces at least a first and second flow of gas, said first flow of gas being relatively colder than said second flow of gas.

7. The separator of claim 6, wherein at least a portion of said first flow of gas is directed proximate to said body so as to facilitate cooling of at least a portion of said body.

8. A separator for facilitating management of an exhaust stream of varying pressure produced by an internal combustion engine, the separator comprising:

a body defining a chamber;

an exhaust inlet connection in flow communication with said chamber;

a nozzle body movably positioned in a nozzle housing, said nozzle body including at least one passage therethrough, the at least one passage being configured to impart a velocity to the exhaust stream so as to facilitate substantial resolution of at least a first component of said exhaust stream; and a positioning member operatively coupled with said nozzle body and configured to position the nozzle body relative to the nozzle housing to change an amount of exposure of at least a portion of the at least one passage to the exhaust inlet.

9. The separator of claim 8, wherein said at least first component substantially comprises at least one liquid.

10. The separator of claim 9, wherein said separator produces at least a first and second flow of gas, said first flow of gas being relatively colder than said second flow of gas, and at least a portion of said first flow of gas being directed proximate to said separator so as to facilitate maintenance of said at least one liquid substantially in liquid form.

11. The separator of claim wherein said at least first component substantially comprises particulates.

12. The separator as recited in claim 8, wherein at least a portion of said at least first component is returned to the engine for combustion.

13. The separator of claim 8, wherein said positioning member includes at least one resilient member disposed in operative relation between said nozzle and said nozzle housing so as to automatically facilitate relative changes of position between said nozzle body and said nozzle housing in response to corresponding changes in exhaust pressure, said relative change in position of said nozzle body at least indirectly facilitating said adjustment of said flowrate of said exhaust into said chamber.

14. The separator of claim 13, wherein said adjustment of exhaust flowrate by said relative change in position of said nozzle body occurs in response to manual input transmitted at least indirectly to said nozzle body.

15. The separator of claim 8 wherein said relative positioning of said nozzle body occurs substantially automatically upon a change in exhaust pressure.

16. A separator for facilitating afterburning of at least a portion of exhaust produced by an internal combustion engine, the separator combining combustion air with the at least a portion of the exhaust so as to facilitate the afterburning thereof, the separator comprising:

a body defining a chamber;

a nozzle housing;

an exhaust inlet connection in communication with said nozzle housing;

a nozzle assembly substantially disposed in said nozzle housing so that exhaust entering said exhaust inlet connection passes through at least a portion of said nozzle assembly and into said chamber, said nozzle assembly configured to adjust flowrate of exhaust into said chamber in response to changes in exhaust system pressure and to impart a substantially rotational motion to said exhaust passing into said chamber so as to facilitate substantial resolution of at least a first component of said exhaust; and at least one combustion air inlet in communication with said chamber, combustion air entering said chamber through said at least one combustion air inlet so as to facilitate afterburning in said chamber of at least a portion of said at least a first component of said exhaust.

17. The separator as recited in claim 16, wherein said nozzle assembly comprises:

a nozzle substantially disposed in said nozzle housing and being in flow communication with said exhaust inlet connection and said chamber so that exhaust entering said exhaust inlet connection passes through said nozzle into said chamber, and said nozzle having at least one inlet aperture, said at least one inlet aperture facilitating said rotational motion of said exhaust entering said chamber; and at least one resilient member disposed in operative relation between said nozzle and said nozzle housing so as to automatically facilitate a relative changes of position between said nozzle and said nozzle housing in response to a corresponding change in exhaust pressure, said relative change in position of said nozzle at least indirectly adjusting said flowrate of said exhaust into said chamber.

18. The separator as recited in claim 17, wherein said relative change in position of said nozzle with respect to said nozzle housing causes a corresponding change in an available inlet area of said at least one nozzle inlet aperture, said available inlet area corresponding to a characteristic flowrate of exhaust through said nozzle.

19. The separator of claim 16, wherein said nozzle assembly facilitates substantial resolution of a second component of said exhaust.

20. The separator of claim 19, wherein said second component of said exhaust is substantially in liquid form.

21. The separator of claim 20, further comprising a collection well in fluid communication with said chamber, at least a portion of said liquid being collected by said collection well from said chamber and returning at least indirectly to a combustion chamber of the internal combustion engine through a fuel recycle line in fluid communication with said collection well, and said liquid being substantially burned in said combustion chamber.

22. The separator according to claim 21, wherein said at least a first component of the exhaust substantially comprises particulates.

23. The separator according to claim 16, wherein said at least a first component of the exhaust substantially comprises particulates.

24. In a separator for use with an internal combustion engine producing exhaust of varying pressure and the internal combustion engine having an exhaust system, the separator having a nozzle housing with an exhaust inlet connection, and the separator having a body defining a chamber with at least one outlet, a nozzle assembly in communication with the exhaust inlet connection and directing exhaust from the exhaust inlet connection to the chamber, the nozzle assembly comprising:

a nozzle substantially disposed in the nozzle housing and having at least one inlet aperture in communication with the exhaust inlet connection and said nozzle defining a passage in communication with said at least one inlet aperture and the chamber, said nozzle imparting a substantially rotational motion to the exhaust passing into the chamber so as to substantially resolve at least a first component of the exhaust; and at least one resilient member disposed in operative relation with said nozzle and said nozzle housing and imposing a relative change in position of said nozzle with respect to said nozzle housing in response to a change in exhaust pressure so as to at least indirectly adjust a flowrate of exhaust through said nozzle.

25. The nozzle assembly of claim 24, wherein said at least one inlet aperture is disposed substantially tangentially with respect to said passage.

26. The nozzle assembly of claim 24, wherein said at least first component of the exhaust is substantially in liquid form.

27. The nozzle assembly of claim 26, wherein at least a portion of said liquid first component resolved by said separator exits the chamber by way of the at least one outlet and returns to said internal combustion engine and is burned therein.

28. The nozzle assembly of claim 26, wherein at least a portion of said liquid first component resolved by said separator is removed from the chamber and reserved for disposal.

29. The nozzle assembly of claim 24, wherein said nozzle assembly maintains a desired relationship between exhaust system back pressure and atmospheric pressure.

30. The nozzle assembly of claim 29, wherein said desired relationship comprises a ratio of exhaust system back pressure to atmospheric pressure.

31. The nozzle assembly of claim 24, wherein said relative change in position of said nozzle with respect to said nozzle housing causes a corresponding change in an available inlet area of said at least one nozzle inlet aperture, said available inlet area corresponding to a characteristic flowrate of exhaust through said nozzle.

32. The nozzle assembly of claim 24, wherein adjustment of flow of the exhaust through said nozzle occurs substantially automatically.

33. A separator for facilitating management of an exhaust stream of varying pressure produced by an internal combustion engine, the separator comprising:

a body defining a chamber;

an exhaust inlet connection in flow communication with said chamber;

means for adjusting flowrate of exhaust into said chamber in response to changes in exhaust system pressure; and means for facilitating substantial resolution of at least a first component of said exhaust wherein said separator produces at least a first and second flow of gas, said first flow of gas being relatively colder than said second flow of gas, and at least a portion of said first flow of gas being directed proximate to said separator so as to facilitate maintenance of said at least one liquid substantially in liquid form.

34. A separator for facilitating management of an exhaust stream of varying pressure produced by an internal combustion engine, the separator comprising:

a body defining a chamber;

an exhaust inlet connection in flow communication with said chamber;

means for adjusting flowrate of exhaust into said chamber in response to changes in exhaust system pressure; and means for facilitating substantial resolution of at least a first component of said exhaust wherein the separator is configured to return at least a portion of said at least first component to the engine for combustion.

35. A separator for facilitating management of an exhaust stream of varying pressure produced by an internal combustion engine, the separator comprising:

a body defining a chamber;

an exhaust inlet connection in flow communication with said chamber;

means for adjusting flowrate of exhaust into said chamber in response to changes in exhaust system pressure; and means for facilitating substantial resolution of at least a first component of said exhaust;

wherein said means for adjusting flowrate of exhaust into said chamber in response to changes in exhaust system pressure and said means for facilitating substantial resolution of at least a first component of said exhaust collectively comprise a nozzle assembly, said nozzle assembly being substantially disposed in a nozzle housing and comprising:

a nozzle in flow communication with said exhaust inlet connection and said chamber so that exhaust entering said exhaust inlet connection passes through said nozzle into said chamber, and said nozzle having at least one inlet aperture, said at least one inlet aperture imparting substantially rotational motion to said exhaust entering said chamber so as to facilitate said substantial resolution of said first component of said exhaust; and at least one resilient member disposed in operative relation between said nozzle and said nozzle housing so as to automatically facilitate relative changes of position between said nozzle and said nozzle housing in response to corresponding changes in exhaust pressure, said relative change in position of said nozzle at least indirectly facilitating said adjustment of said flowrate of said exhaust into said chamber.

36. The separator of claim 35, wherein said adjustment of exhaust flowrate by said nozzle assembly occurs in response to manual input transmitted at least indirectly to said nozzle assembly.

* * * * *